United States Patent [19]
Hasegawa et al.

[11] Patent Number: 5,885,689
[45] Date of Patent: *Mar. 23, 1999

[54] LAMINATED POLYESTER FILM FOR USE AS FILM WITH WHICH METAL PLATE IS TO BE LAMINATED

[75] Inventors: Kinji Hasegawa; Takeo Asai; Mitsumasa Ono; Takafumi Kudo, all of Sagamihara, Japan

[73] Assignee: Teijin Limited, Osaka, Japan

[*] Notice: The term of this patent shall not extend beyond the expiration date of Pat. No. 5,814,385.

[21] Appl. No.: 735,207

[22] Filed: Oct. 22, 1996

Related U.S. Application Data

[63] Continuation of Ser. No. 317,476, Oct. 4, 1994, abandoned.

[30] Foreign Application Priority Data

| Oct. 4, 1993 | [JP] | Japan | 5-248085 |
| Oct. 6, 1993 | [JP] | Japan | 5-250502 |
| Oct. 6, 1993 | [JP] | Japan | 5-250503 |

[51] Int. Cl.$^6$ .......................... B32B 27/08; B32B 27/20; B32B 27/36
[52] U.S. Cl. .................. 428/141; 428/35.8; 428/213; 428/215; 428/216; 428/323; 428/458; 428/480; 428/910; 428/339
[58] Field of Search .................. 428/323, 327, 428/328, 329, 336, 330, 331, 339, 458, 480, 483, 35.8, 35.9, 141, 694.56, 213, 215, 216; 525/437, 444, 448

[56] References Cited

U.S. PATENT DOCUMENTS

| 3,884,870 | 5/1975 | Dooson | 260/40 R |
| 4,041,206 | 8/1977 | Tsunashima et al. | 428/409 |
| 4,138,386 | 2/1979 | Motegi et al. | 260/40 R |
| 4,362,775 | 12/1982 | Yabe et al. | 428/213 |
| 4,735,835 | 4/1988 | Taira et al. | 428/35 |
| 4,798,759 | 1/1989 | Dallman et al. | 428/220 |
| 5,292,471 | 3/1994 | Ito et al. | 264/171 |
| 5,300,335 | 4/1994 | Miyazawa et al. | 428/35.8 |
| 5,384,354 | 1/1995 | Hasegawa et al. | 524/539 |
| 5,424,121 | 6/1995 | Murakami et al. | 428/337 |

FOREIGN PATENT DOCUMENTS

| 0204528 | 12/1986 | European Pat. Off. . |
| 0312303 | 4/1989 | European Pat. Off. . |
| 0312304 | 4/1989 | European Pat. Off. . |
| 0402004 | 12/1990 | European Pat. Off. . |
| 0574232 | 12/1993 | European Pat. Off. . |
| 0576682 | 1/1994 | European Pat. Off. . |
| 0580404 | 1/1994 | European Pat. Off. . |
| 0586161 | 3/1994 | European Pat. Off. . |
| 2055687 | 3/1981 | United Kingdom . |

OTHER PUBLICATIONS

Japanese Laid–Open Patent Publication No. 192,545 /1989 abstract.
Japanese Laid–Open Patent Publication No. 195,546 / 1989 abstract.
Japanese Laid–Open Patent Publication No. 22,530 / 1989 abstract.
Japanese Laid–Open Patent Publication No. 57,339 / 1990 abstract.
Japanese Laid–Open Patent Publication No. 78,953 / 1977 abstract.
Japanese Laid–Open Patent Publication No. 78/954 / 1977 abstract.
Japanese Laid–Open Patent Publication No. 71,154 / 1978 abstract.

*Primary Examiner*—Vivian Chen
*Attorney, Agent, or Firm*—Sherman and Shalloway

[57] ABSTRACT

A laminated polyester film for use as a film to be laminated on a metal plate, which comprises (A) a first layer formed of (a1) a first aromatic copolyester prepared in the presence of a germanium compound as a polymerization catalyst, which contains terephthalic acid as the main dicarboxylic acid component and ethylene glycol as the main glycol component and which has a melting point in the range of from 210° to 245° C. and a glass transition temperature of at least 60° C., the first layer having (a2) a surface roughness (Ra) in the range of from 2 to 13 nm, and (B) a second layer formed of (b1) a polyester composition obtained by melt-mixing 90 to 45% by weight of a second aromatic copolyester which is composed, as a main recurring unit, of ethylene terephthalate, is produced in the presence of a germanium compound as a polymerization catalyst and has a melting point in the range of from 210° to 252° C. and 10 to 55% by weight of a third aromatic polyester which is composed, as a main recurring unit, of tetramethylene terephthalate and has a melting point in the range of from 180° to 223° C., the second layer having (b2) a surface roughness (Ra) of 15 to 50 nm; and (C) which exhibits excellent moldability when a metal plate laminated therewith is deep-drawn.

21 Claims, No Drawings

LAMINATED POLYESTER FILM FOR USE AS FILM WITH WHICH METAL PLATE IS TO BE LAMINATED

This application is a continuation of application Ser. No. 08/317,416, filed Oct. 4, 1994, abandoned.

FIELD OF THE INVENTION

The present invention relates to a polyester film for use as a film to be laminated on a metal plate. More specifically, it relates to a polyester film for preparing a metal plate laminated therewith, which exhibits excellent moldability during the deep-drawing of a metal plate laminated with the film in the step of making cans, and which has excellent take-up properties and enables the production of cans, e.g., beverage cans and food cans, of a metal plate laminated with the film excellent in heat resistance, resistance to embrittlement under retort treatment, flavor and taste retaining property and impact resistance.

BACKGROUND OF THE INVENTION

Inner and outer surfaces of metal cans generally have coatings for the protection against corrosion. For simplifying the manufacturing step, improving the sanitary condition and preventing the environmental pollution, however, there have been recently developed methods of imparting rust-proof properties to metal cans without using any organic solvent. One of the methods is to coat metal cans with a film of a thermoplastic resin. That is, studies have been being made of a method in which a plate of tin-plated steel, tin-free steel or aluminum is laminated with a film of a thermoplastic resin and the resultant laminate is deep-drawn to make cans. Attempts have been made to use a polyolefin film or a polyamide film as the above film of a thermoplastic resin, but not all of moldability, heat resistance, flavor retaining property and impact resistance are satisfied.

On the other hand, a polyester film, or a polyethylene terephthalate film in particular, is drawing attention as one having well-balanced properties, and several proposals have been made to use it as a base film as follows.

(A) A metal plate is laminated with a biaxially oriented polyethylene terephthalate film through an adhesive layer of a polyester having a low melting point, and the resultant laminate is used as a material for making cans (see Japanese Laid-open Patent Publications Nos. 10,451/1981 and 192,546/1989).

(B) A metal plate is laminated with a film of an aromatic polyester having amorphous nature or very low crystallinity, and the resultant laminate is used as a material for making cans (see Japanese Laid-open Patent Publications Nos. 192,545/1989 and 57,339/1990).

(C) A metal plate is laminated with a heat-set, biaxially oriented polyethylene terephthalate film having a low orientation degree, and the resultant laminate is used as a material for making cans (see Japanese Laid-open Patent Publication No. 22,530/1989).

Concerning (A), the biaxially oriented polyethylene terephthalate film is excellent in heat resistance and flavor retaining property, while it is insufficient in moldability so that it is whitened (causes fine cracks) or broken during the can-making processing which entails large deformation.

Concerning (B), the film used is an amorphous or very low crystalline aromatic polyester film and therefore has excellent moldability, while the film is poor in flavor retaining property and is liable to embrittle when printing is effected on the film, cans are post-treated for retort treatment or cans are stored for a long period of time, and the embrittled film is liable to break due to an external impact.

Concerning (C), the laminate is to produce an effect in a region between (A) and (B), while the film has not yet attained the low orientation degree which can be applied to can-making processing. Further, even if the laminated is moldable in a region where the degree of deformation is small, the film is liable to embrittle when printing is thereafter effected or when the can is subjected to retort treatment for sterilizing canned contents, and the embrittled film is liable to break due to an external impact, as discussed concerning (B).

Further, the lubricity and abrasion resistance of a polyester film are main factors which have an influence on the processability in the step of film production and the step of laminate processing for various uses and on the product quality.

That is, when the lubricity is insufficient, a crease is liable to occur on the film in the step of taking up the film, or a crease is liable to take place on the film when the film is laminated on a metal. When the abrasion resistance is insufficient, pinholes are liable to occur on the film in the drawing step for making cans, and the film breaks in an extreme case. Thus, the film does not serve as a coating on inner and outer surfaces of a metal can.

For improving a magnetic recording film in lubricity and abrasion resistance, there is generally employed a method in which the film is imparted with an uneven surface by incorporating inert fine particles, so that the contact area of the film to a roll and a processing tool decreases. Generally, the larger the size of the fine particles in a polymer as a raw material is, the greater the effect on the improvement in lubricity. It is well known practice to incorporate inert fine particles of calcium carbonate, titanium dioxide or kaolin, or inert fine particles of at least two of these (combination of particles having a greater size and particles having a smaller size) (see Japanese Laid-open Patent Publications Nos. 34,272/1976, 78,953/1977, 78,954/1977, 41,355/1978 and 71,154/1978).

However, in the step of a drawing process for making cans which involves a large deformation, as the size of the fine particles increases, the size of voids formed in the interface between each fine particle and a polyester at the time of deformation increases, and the projections of the fine particles are altered into moderate shapes to increase a frictional coefficient at the time of processing. At the same time, some particles may drop off due to small scratches formed on the voids, which may cause the occurrence of pinholes or the breakage of the film.

It is an object of the present invention to provide a laminated polyester film for use as a film to be laminated on a metal plate, which retains excellent moldability, heat resistance, resistance to embrittlement under retort treatment and flavor retaining property of a copolyester film and further has other excellent performances.

It is another object of the present invention to provide a laminated polyester film for use as a film to be laminated on a metal plate, which is improved in impact resistance, particularly, which is almost free from having cracks when an impact is exerted at a low temperature.

It is further another object of the present invention to provide a polyester film for use as a film to be laminated on a metal plate, which is free from affecting the tastes of refreshing beverages and excellent in flavor retaining property.

Other objects and advantages of the present invention will be apparent from the following description.

DETAILED DESCRIPTION OF THE INVENTION

According to the present invention, the above objects and advantages of the present invention are achieved, first, by a laminated polyester film for use as a film to be laminated on a metal plate, which comprises (A) a first layer formed of (a1) a first aromatic copolyester produced in the presence of a germanium compound as a polymerization catalyst, which contains terephthalic acid as the main dicarboxylic acid component and ethylene glycol as the main glycol component and which has a melting point in the range of from 210° to 245° C. and a glass transition temperature of at least 60° C., the first layer having (a2) a surface roughness (Ra) in the range of from 2 to 13 nm, and (B) a second layer formed of (b1) a polyester composition obtained by melt-mixing 90 to 45% by weight of a second aromatic copolyester which is composed, as a main recurring unit, of an ethylene terephthalate, is produced in the presence of a germanium compound as a polymerization catalyst and has a melting point in the range of from 210° to 252° C. and 10 to 55% by weight of a third aromatic polyester which is composed, as a main recurring unit, of a tetramethylene terephthalate and has a melting point in the range of from 180° to 223° C., the second layer having (b2) a surface roughness (Ra) of at least 15 nm, and (C) which exhibits excellent moldability when a metal plate laminated therewith is deep-drawn.

As described above, the laminated polyester of the present invention comprises a first layer (A) and a second layer (B).

The first layer (A) is formed of a first aromatic copolyester and has a surface roughness (Ra) in the range of from 2 to 13 nm.

In the first aromatic copolyester, the main dicarboxylic acid component is terephthalic acid, and the main glycol component is ethylene glycol. The dicarboxylic acid component constituting the first aromatic copolyester comprises terephthalate in an amount of at least 80 mol % based on the total amount of dicarboxylic acid components, and similarly, the glycol component comprises an ethylene glycol component in an amount of at least 95 mol % based on the total amount of glycol components.

Further, the first aromatic copolyester preferably contains a subsidiary dicarboxylic acid component other than terephthalic acid in an amount of 5 to 19 mol % based on the total amount of the dicarboxylic acid components.

In the first aromatic copolyester, the subsidiary dicarboxylic acid other than the terephthalic acid includes aromatic dicarboxylic acids such as phthalic acid, isophthalic acid and naphthalenedicarboxylic acid, aliphatic dicarboxylic acids such as adipic acid, azelaic acid, sebacic acid and decanedicarboxylic acid, and alicyclic dicarboxylic acids such as cyclohexanedicarboxylic acid. Of these, isophthalic acid is preferred as a subsidiary dicarboxylic acid. The subsidiary glycol other than ethylene glycol includes aliphatic diols such as diethylene glycol, butanediol and hexanediol, and alicyclic diols such as cyclohexanedimethanol. A component from the above subsidiary dicarboxylic acid and a component from the above subsidiary glycol are contained in an amount of 3 mol % or less each based on the total amount of dicarboxylic acid components and the total amount of glycol components.

The first aromatic copolyester has a melting point in the range of from 210° to 245° C., preferably in the range of from 215° to 235° C. When the above melting point is less than 210° C., the laminated film shows poor heat resistance. When the melting point exceeds 245° C., the polymer has too high a crystallinity to molding-process.

The above melting point of the first aromatic copolyester is determined according to a method in which a melting peak is determined with a Du Pont Instruments 910 DSC at a temperature elevation rate of 20° C./minute. In this case, about 20 mg of a sample of the first aromatic copolyester is used.

The intrinsic viscosity of the first aromatic copolyester is preferably 0.52 to 0.80, more preferably 0.54 to 0.70, particularly preferably 0.57 to 0.65.

The first aromatic copolyester may be produced by any one of a Direct Polymerization method and a DMT method (ester exchange method). In the DMT method, the ester exchange catalyst is preferably selected from manganese compounds such as manganese acetate and titanium compounds such as titanium acetate and titanium tetrabutoxide. Further, a germanium compound is used as a polymerization catalyst in the polymerization step. The germanium catalyst is selected from (a) amorphous germanium oxide,
(b) fine crystalline germanium oxide,
(c) a solution prepared by dissolving germanium oxide in glycol in the presence of an alkaline metal, an alkaline earth metal or a compound of any one of these compounds, and
(d) a solution of germanium oxide in water.

The amount of the germanium compound catalyst, as a germanium atomic amount remaining in the first aromatic copolyester, is preferably 40 to 200 ppm, more preferably 60 to 150 ppm.

In the first aromatic copolyester, the methyl terminal concentration in the copolyester is preferably 15 eq mol/$10^6$ g or less, more preferably 10 eq mol/$10^6$ or less. When the methyl terminal concentration in the copolyester is too high, the copolyester is liable to generate white dust when molding-processed, or a can may be poor in flavor retaining property.

Further, the first aromatic copolyester is required to have a glass transition temperature of at least 60° C., and this glass transition temperature is preferably at least 70° C. When the glass transition temperature is less than 60° C., no satisfactory flavor retaining property is obtained. As the first aromatic copolyester, preferred is an isophthalate copolyester, since a copolyester having a high glass transition temperature can be obtained.

The surface roughness (Ra) of the first layer (A) is preferably in the range of from 2 to 10 nm.

The first aromatic copolyester may contain inert fine particles. As inert fine particles, preferred is a combination of first inert fine particles having an average particle diameter (d1) of 0.05 to 0.6 μm and second inert fine particles having an average particle diameter (d2) of 0.3 to 2.5 μm. The average particle diameter (d1) of the first inert fine particles is preferably 0.08 to 0.5 μm, more preferably 0.1 to 0.4 μm. Further, the average particle diameter (d2) of the second inert fine particles is preferably 0.5 to 2 μm, more preferably 0.6 to 1.8 μm.

The ratio of the average particle diameter (d2) of the second inert fine particles to the average particle diameter (d1) of the first inert fine particles is at least 2.5, preferably at least 3.0.

The raw material for the first inert fine particles may be inorganic or organic, while it is preferably inorganic. The raw material for inorganic inert fine particles includes silica, alumina, kaolin, titanium dioxide, calcium carbonate and barium sulfate. The organic inert fine particles include a crosslinked silicone resin particles and crosslinked polystyrene particles.

The first inert fine particles may be of one kind of the above inert fine particles or a combination of at least two kinds thereof. Further, the first inert fine particles may be used in combination with other inert fine particles as required.

In view of the prevention of occurrence of pinholes, the first and second inert fine particles are preferably monodisperse particles having a particle diameter ratio (long diameter/short diameter) of 1.0 to 1.2. The particles as the above monodisperse particles include spherical silica, spherical titanium dioxide, spherical silicone resin particles and spherical crosslinked polystyrene particles.

The average particle diameter and particle diameter ratio of spherical monodisperse inert fine particles are calculated as follows. A metal is vapor-deposited on surfaces of particles, and long diameters, short diameters and area circle-corresponding diameters are determined on the basis of an image magnified, e.g., 10,000 to 30,000 times, through an electron microscope. These values are fitted to the following equations.

Average particle diameter=total of area circle-corresponding diameters of measured particles/number of measured particles.

Particle diameter ratio=average of long diameters of particles/average of short diameters of the particles.

The spherical particles preferably have a sharp particle size distribution, and the relative standard deviation which shows the sharpness of the distribution is preferably 0.5 or less, more preferably 0.3 or less.

$$\text{The relative standard deviation} = \sqrt{\frac{\sum_{i=1}^{n}(Di - \overline{D})^2}{n}} / \overline{D}$$

wherein:

Di=area circle-corresponding diameter (am) of each particle,

D=Average of area circle-corresponding diameters $$\left( = \sum_{i=1}^{n} Di/n \right) (\mu m),$$

and n=number of particles.

The content of the above first inert fine particles in the first layer (A) is preferably in the range of from 0.01 to 3% by weight, more preferably 0.1 to 1.0% by weight, particularly preferably 0.2 to 0.5% by weight.

The content of the second inert fine particles in the first layer (A) is preferably 0.001 to 0.2% by weight, more preferably 0.002 to 0.1% by weight, particularly preferably 0.005 to 0.05% by weight.

The first aromatic copolyester may contain the first inert fine particles having an average particle diameter (d1) of 0.05 to 0.6 μm alone without containing the second inert fine particles. In this case, however, it is essential that the above first inert fine particles are contained such that the content (C) of the first inert fine particles satisfies the following formula, $$0.0072 d1^{-0.65} \leq C \leq 0.80 d1^{0.44}$$

wherein d1 is an average particle diameter (μm) of the first inert fine particles and C is a content (wt %) of the first inert fine particles.

In the above case, the average particle diameter (d1) of the first inert fine particles is, again, preferably 0.08 to 0.5 μm, more preferably 0.1 to 0.4 μm. Further, the above monodisperse particles having a particle diameter ratio of 1.0 to 1.2 are preferred as the above first inert fine particles.

The average particle diameter and content of the first inert fine particles preferably satisfies the following relationship.

$$0.0014 d1^{-0.65} \leq C \leq 0.55 d1^{-0.44}$$

wherein d and C are as defined in the above formula.

The second layer (B) is formed of a blend prepared by melting the second aromatic copolyester and a third aromatic (co)polyester.

The second aromatic copolyester comprises ethylene terephthalate as a main recurring unit and has a melting point in the range of from 210° to 252° C., preferably 210° to 245° C.

The second aromatic copolyester may contain at least one dicarboxylic acid component selected from the group consisting of aromatic dicarboxylic acids other than terephthalic acid, aliphatic dicarboxylic acids and alicyclic dicarboxylic acids, in an amount of 2 to 19 mol % based on the total of dicarboxylic acid components.

The second aromatic copolyester may contain at least one glycol component selected from the group consisting of aliphatic glycols other than ethylene glycol and alicyclic glycols, in an amount of 2 to 19 mol % based on the total of glycol components.

The aromatic dicarboxylic acids other than terephthalic acid include those described concerning the first aromatic copolyester. Similarly, the aliphatic dicarboxylic acids, alicyclic dicarboxylic acids, aliphatic glycols other than ethylene glycol and alicyclic glycols include those described concerning the first aromatic copolyester.

The second aromatic copolyester is obtained by polymerization in the presence of a germanium compound as a polymerization catalyst. The germanium compound is selected from those described concerning the first aromatic copolyester.

The third aromatic polyester may be a homopolyester of tetremethylene terephthalate as a substantial recurring unit, and it may be also a copolyester of it as a main recurring unit.

When the third aromatic polyester is a copolyester, the subsidiary dicarboxylic acid other than the terephthalic acid is at least one dicarboxylic acid selected from the group consisting of aromatic dicarboxylic acids other than terephthalic acid, aliphatic dicarboxylic acids and alicyclic dicarboxylic acids. The aromatic dicarboxylic acids other than terephthalic acid, aliphatic dicarboxylic acids and alicyclic dicarboxylic acids include those already described.

The third aromatic polyester has a melting point in the range of from 180° to 223° C.

The blend of the second aromatic copolyester and the third aromatic polyester contains 90 to 45% by weight of the second aromatic copolyester and 10 to 55% by weight of the third aromatic polyester. Preferably, the above blend contains 80 to 45% by weight of the second aromatic copolyester and 20 to 55% by weight of the third aromatic polyester.

Like the first layer (A), the second layer (B) may contain inert fine particles. Preferred as the inert fine particles are third inert fine particles having an average particle diameter (d3) of 0.8 to 2.5 μm. The content of the third inert fine particles in the second layer (B) is 0.03 to 0.5% by weight.

When the average particle diameter of the third inert fine particles is less than 0.8 μm, the film is liable to show insufficient lubricity, and the film tends to be poor in winding properties in the step of producing the film. When the above average particle diameter exceeds 2.5 μm, undesirably, a pinhole is likely to start from a coarse particle in that portion of the film which is deformed, or the film is likely to break, when a metal plate laminated with the film is deep-drawn to make a can. When the content of the third inert fine particles is less than 0.03% by weight, the film is liable to be poor in lubricity. When it exceeds 0.5% by weight, undesirably, the film is liable to break when a metal plate laminated with the film is deep-drawn to make a can.

The average particle diameter of the third inert fine particles is preferably 1.0 to 2.3 μm, and the content thereof is preferably 0.05 to 0.5% by weight.

The third inert fine particles can be selected from particles of those materials described concerning the first inert fine particles.

The third inert fine particles may be of one kind of the inert fine particles or a combination of at least two kinds thereof. Further, other lubricant may be used in combination.

In view of the prevention of occurrence of pinholes, the third inert fine particles are preferably the same monodisperse particles having a particle diameter ratio (long diameter/short diameter) of 1.0 to 1.2 as those described as the first inert fine particles for the first layer (A).

The second layer (B) characteristically shows a cold crystallization temperature which is in the range of from 90° to 160° C., preferably 110° to 150° C., particularly preferably 120° to 150° C.

The cold crystallization temperature (Tcc) is measured as follows. That is, the sample is placed in the same measurement apparatus as the apparatus for measurement of a melting point. The temperature is elevated from a room temperature to 290° C. at a temperature-elevating rate of 20° C./min. This temperature is maintained for 3 minutes and then, rapidly cooled to near room temperature using a metal plate cooled to 0° C. Thereafter, the temperature is again elevated and the maximum value of an endothermic peak is obtained. This maximum value is taken as a Tcc. The amount of the sample is about 20 mg.

The surface roughness (Ra) of the second layer (B) is preferably at least 15 nm, more preferably in the range of from 15 to 80 nm.

When the surface roughness (Ra) is less than 15 nm, undesirably, the film is poor in handling (winding) properties.

The laminated polyester film of the present invention comprises the first layer (A) and the second layer (B) as described above.

The ratio ((A)/(B)) of the thickness of the first layer (A) to the thickness of the second layer (B) is preferably in the range of from 0.02 to 0.67, more preferably 0.04 to 0.43, particularly preferably 0.04 to 0.25.

The thickness of the laminated polyester film of the present invention is preferably in the range of from 6 to 75 μm, more preferably 10 to 75 μm, particularly preferably 15 to 50 μm.

The laminated polyester film of the present invention exhibits excellent moldability when a metal plate laminated with this laminated polyester film is deep-drawn. In particular, the laminated polyester film of the present invention characteristically shows a value of 0.1 mA or less in deep-draw processability-2 to be described later when a metal plate laminated with this laminated polyester film is deep-drawn.

The laminated polyester film of the present invention has a structure of a laminate composed of the first layer (A) formed of the first aromatic copolyester and the second layer (B) formed of the second and third aromatic (co)polyesters. This laminated structure can be produced by a method in which the polyesters to constitute the layers are separately melted, co-extruded and laminate-fused before solidified and then the laminate is biaxially oriented and heat-set, or a method in which each polyester is separately melted and extruded to prepare films, and then the films are laminate-fused before or after stretched.

The laminated polyester film of the present invention may be an unstretched film, but it is generally used in a biaxially oriented and heat-set state.

In the laminated polyester film of the present invention, advantageously, the plane orientation coefficient of the first layer (A) is 0.08 to 0.16, preferably greater than 0.09 to 0.15, more preferably greater than 0.10 to 0.14. In case where the above plane orientation coefficient is less than 0.08, undesirably, the film is liable to undergo cracking when the deep-draw ratio of deep-draw processing is increased. On the other hand, when the plane orientation coefficient exceeds 0.16, the film may break in deep-draw processing, and the deep-draw processing itself may be hampered.

The above plane orientation coefficient is defined by the following equation.

$$f=[(nx \times ny)/2]-nz$$

In the above equation f is a plane orientation coefficient, nx is a refractive index of a film in the width direction, ny is a refractive index of the film in the length direction, and nz is a refractive index of the film in the thickness direction.

The above refractive index is measured as follows. A polarizer is attached to the ocular side of an Abbe refractometer, and a film sample is measured for a refractive index in each direction using monochromatic NaD ray. Methylene iodide is used as a mount liquid, and the measurement temperature is set at 25° C.

The heat shrinkage percentage of the laminated polyester film of the present invention measured at 150° C. is preferably 10% or less, more preferably 7% or less, particularly preferably 6% or less.

The above heat shrinkage percentage is determined as follows. Two points (about 10 cm apart from each other) are marked on a sample film at room temperature, and the sample film is held in a hot air-circulating oven at 150° C. for 30 minutes. Then, the sample film is taken back into room temperature, the distance between the above-marked two points is measured, and a difference between the distance before the above treatment at 150° C. and the distance after the above treatment at 150° C. is measured. The heat shrinkage percentage is calculated on the basis of the above difference and the distance before the treatment at 150° C. The heat shrinkage percentage of the film in the longitudinal direction is taken as the heat shrinkage percentage of the film.

When the laminated polyester film has a heat shrinkage percentage (150° C.) of over 10%, it greatly shrinks when laminated onto a metal plate, and undesirably, it is liable to crease. When this heat shrinkage percentage is 10% or less, further 7% or less, particularly 6% or less, the laminated polyester film is almost free of the occurrence of a crease when laminated onto a metal plate.

The laminated polyester film which satisfies the above plane orientation coefficient and heat shrinkage percentage (150° C.) can be obtained, for example, under conditions where the consecutive biaxially stretching is carried out at a stretch ratio of 2.5 to 3.6 in the longitudinal direction and at a stretch ratio of 2.7 to 3.6 in the transverse direction and the heat setting is carried out at 150° to 220° C., preferably 160° to 220° C.

The refractive index of the first layer (A) is preferably 1.505 to 1.550, more preferably over 1.510 but below 1.540. When the refractive index is too low, the film is insufficient in moldability. When it is too high, the film may have a nearly amorphous structure and may be poor in heat resistance.

A film formed of the first layer (A) of the laminated polyester film of the present invention alone is insufficient in impact resistance at a low temperature, and a film formed of the second layer.(B) of the laminated polyester film of the present invention alone is poor in flavor retaining property and rustproof property at a high temperature.

The metal plate which is to be laminated with the laminated polyester film of the present invention, particularly the metal plate for making cans, preferably includes a plate of tin-plated steel, a plate of tin-free steel and a plate of aluminum. The laminated polyester film can be laminated onto the metal plate by any one of the following methods (1) and (2).

(1) The metal plate is heated to a temperature equal to, or higher than, a melting of the film, and the film is laminated thereto. The resultant laminate is cooled so that the surface portion (thin layer portion) of the film which is in contact with the metal plate is brought into an amorphous state and intimately bonded to the metal plate.

(2) The film is primer-coated with an adhesive, and the primer coating surface and the metal plate are bonded to each other. The adhesive can be selected from known resin adhesives such as epoxy adhesives, epoxy-ester adhesives and alkyd adhesives.

When the laminated polyester film of the present invention is laminated onto the metal plate, it is preferred to attach the second aromatic copolyester layer (B) side to the metal plate.

The layer (A) having a smaller surface roughness (Ra) is used as a surface layer of a can, and the layer (B) having a larger surface roughness (Ra) is attached to the metal plate. The use of the laminated polyester film of the present invention in the above manner is advantageous for preventing the occurrence of pinholes which might be caused by the lubricant (inert fine particles) in processing.

In the laminated polyester film of the present invention, an additional layer may be provided between the first layer (A) and the second layer (B) or on one of the first layer (A) and the second layer (B).

EXAMPLES

The present invention will be further explained hereinafter with reference to Examples.

Examples 1–8 and Comparative Examples 1–6

A polyethylene terephthalate having a copolyer component shown in Table 1 (produced in the presence of 0.018 part by weight of tetrabutyl titanate as an ester-exchange catalyst and 0.027 part by weight of germanium oxide as a polycondensation catalyst, and having an intrinsic viscosity of 0.64 and containing 0.1% by weight of spherical silica having an average particle diameter of 0.3 μm) and a polyester composition containing 0.1% by weight of spherical silica having a particle diameter ratio of 1.1 and an average particle diameter of 1.5 μm, which was composed of a polyethylene terephthalate having a copolymer component shown in Table 1 (produced in the presence of tetrabutyl titanate as an ester-exchange catalyst and germanium oxide as a polycondensation catalyst) and polybutylene terephthalate or copolybutylene terephthalate (produced in the presence of tetrabutyl titanate as a polycondensation catalyst), were individually dried, melted and co-extruded through adjacent dies according to conventional methods to laminate and fuse the extrudates, and the laminate was solidified by quenching to form an unstretched laminated film in which the polyethylene terephthalate formed a first layer (A) and the polyester composition formed a second layer (B).

Then, the above unstretched film was stretched in the longitudinal direction at a stretch ratio of 3.0 at 110° C. and then stretched in the transverse direction at a stretch ratio of 3.0 at 125° C., and the stretched film was heat-set at 190° C. to give a biaxially oriented laminated film.

The above-obtained film had a thickness of 25 μm. The first layer (A) had a thickness of 5 μm and a surface roughness (Ra) of 7 nm, and the second layer (B) had a thickness of 20 μm and a surface roughness (Ra) of 25 nm.

The surface roughness (Ra) was measured with a contacting needle method surface roughness measuring apparatus (SURFCORDER SE-30C) supplied by Kosaka Laboratory Co., Ltd under conditions where the radius of contacting needle top was 2 μm, the measurement pressure was 0.03 g and the cut-off value was 0.25 mm.

TABLE 1

| | First layer (A) | | | | Second layer (B) | | | | | | | | |
|---|---|---|---|---|---|---|---|---|---|---|---|---|---|
| | | | | Glass | Copolymer PET* | | | | PBT** or copolymer PBT | | | | |
| | Copolymer component | | Melting | transition | Copolymer component | | Melting | Intrinsic | | Copolymer component | | Melting | Intrinsic | |
| | Composition | mole % | point (°C.) | temp. (°C.) | Composition | mole % | point (°C.) | viscosity *** | Weight (%) | Composition | mole % | point (°C.) | viscosity *** | Weight (%) |
| Comp. Ex. 1 | IA**** | 20 | 206 | 71 | IA | 7 | 240 | 0.71 | 55 | — | — | 223 | 0.91 | 45 |
| Ex. 1 | " | 18 | 213 | 72 | " | 7 | 240 | 0.71 | 55 | — | — | 223 | 0.91 | 45 |
| Ex. 2 | " | 12 | 229 | 73 | " | 7 | 240 | 0.71 | 55 | — | — | 223 | 0.91 | 45 |
| Ex. 3 | " | 8 | 239 | 74 | " | 7 | 240 | 0.71 | 55 | — | — | 223 | 0.91 | 45 |
| Comp. Ex. 2 | " | 2 | 250 | 76 | " | 7 | 240 | 0.71 | 55 | — | — | 223 | 0.91 | 45 |
| Comp. Ex. 3 | SA***** | 9 | 235 | 55 | " | 7 | 240 | 0.71 | 55 | — | — | 223 | 0.91 | 45 |
| Ex. 4 | " | 5 | 245 | 64 | " | 7 | 240 | 0.71 | 55 | — | — | 223 | 0.91 | 45 |

*PET: Polyethylene terephthalate
**PBT: Polybutylene terephthalate
***Intrinsic viscosity before preparation of composition
****IA: Isophthalic acid
*****SA: Sebacic acid TABLE 1-continued

| | First layer (A) | | | | Second layer (B) | | | | | | | |
|---|---|---|---|---|---|---|---|---|---|---|---|---|
| | | | | Glass | Copolymer PET* | | | | PTMT** or copolymer PTMT | | | |
| | Copolymer component | | Melting | transition | Copolymer component | | Melting | Intrinsic | | Copolymer component | | Melting | Intrinsic | |
| | Composition | mole % | point (°C.) | temp. (°C.) | Composition | mole % | point (°C.) | viscosity *** | Weight (%) | Composition | mole % | point (°C.) | viscosity *** | Weight (%) |
| Comp. Ex. 4 | IA**** | 12 | 229 | 73 | IA | 9 | 235 | 0.65 | 40 | IA | 5 | 214 | 0.89 | 60 |
| Ex. 5 | " | 12 | 229 | 73 | " | 9 | 235 | 0.70 | 59 | " | 5 | 214 | 0.89 | 41 |
| Ex. 6 | " | 12 | 229 | 73 | SA***** | 9 | 235 | 0.70 | 75 | " | 5 | 214 | 0.89 | 25 |
| Ex. 7 | " | 12 | 229 | 73 | " | 12 | 229 | 0.70 | 80 | — | — | 223 | 0.91 | 20 |
| Ex. 8 | " | 12 | 229 | 73 | " | 7 | 240 | 0.65 | 55 | IA | 20 | 192 | 0.87 | 45 |
| Comp. Ex. 5 | " | 12 | 229 | 73 | SA | 12 | 229 | 0.65 | 100 | — | — | — | — | 0 |
| Comp. Ex. 6 | " | 12 | 229 | 73 | IA | 22 | 208 | 0.65 | 85 | — | — | 223 | 0.92 | 15 |

*PET: Polyethylene terephthalate
**PTMT Polytetramethylene terephthalate
***Intrinsic viscosity before preparation of composition
****IA: Isophthalic acid
*****SA: Sebacid acid Comparative Examples 7 and 8

A single-layered film which was formed of a first layer (A) alone and had a thickness of 25 μm (Comparative Example 7) and a single-layered film which was formed of a second layer (B) alone and had a thickness of 25 μm (Comparative Example 8) were prepared in the same manner as in Example 2.

Examples 9–10 and Comparative Examples 9 and 10

Biaxially oriented films were prepared in the same manner as in Example 2 except that the average particle diameters and amounts of spherical silica to be contained in a first layer (A) and those of titanium dioxide to be contained in a second layer (B) were changed as shown in Table 2 to change the surface roughness (Ra) of each layer.

TABLE 2

| | First layer (A) | | | Second layer (B) | | |
|---|---|---|---|---|---|---|
| | Silica | | Surface | Titanium dioxide | | Surface |
| | Average particle diameter (m) | Amount (wt. %) | Roughness (Ra) (nm) | Average particle diameter (m) | Amount (wt. %) | Roughness (Ra) (nm) |
| Comp. Ex. 9 | 0.3 | 0.48 | 7 | 0.5 | 0.62 | 13 |
| Ex. 9 | 0.8 | 0.17 | 11 | 1.2 | 0.1 | 16 |
| Ex. 10 | 1.2 | 0.06 | 13 | 1.5 | 0.08 | 20 |
| Comp. Ex. 10 | 1.2 | 0.1 | 16 | 1.5 | 0.1 | 23 |

Comparative Examples 11–13

Biaxially oriented films were obtained in the same manner as in Examples 1 to 3 except that germanium dioxide as the polymerization catalyst was replaced with 0.06 parts by weight of antimony trioxide.

Each of the twenty-three films obtained in Examples 1 to 10 and Comparative Examples 1 to 13 was attached to both surfaces of a 0.25 mm thick tin-free steel plate heated at 230° C., and the laminates were cooled with water. Then, disk-shaped pieces having a diameter of 150 mm were taken, and deep-drawn at four stages with a drawing die and a punch to produce side-seamless containers having a diameter of 55 mm (to be abbreviated as "cans" hereinafter).

The above cans were observed and tested, and evaluated on the basis of the following standards.

(1) Deep-draw processability-1

○: A laminate can be processed without causing any defect on a film, and the film shows no opacification or breakage.

Δ: Whitening of the film is observed at upper portion of the metal can.

X: Breakage was observed in some portions of the film.

(2) Deep-draw processability-2:

○: A laminate is deep-drawn without causing any defect on a film, and when the inner film-coated surface is subjected to a rustproof test (hereinafter referred to as ERV test) (1% NaCl aqueous solution is charged in the can, an electrode is inserted therein, the can body is used an anode, and when a voltage of 6 V is applied, an electric current value is measured), the current value is 0.1 mA or less.

X: A film visually shows no defectiveness, while the measured current value in the ERV test is more than 0.1 mA in ERV test. When the part through which the electric current is passed is magnified for observation, pinhole-like cracks starting at coarse lubricant particles are observed in the sample film.

(3) Impact resistance

Excellently deep-draw molded cans are filled with water to full, and cooled to 0° C. Ten water-filled cans of the same laminate as one group are dropped from a height of 30 cm on a polyvinyl chloride tiled floor. Then, the cans are subjected to the ERV test. The results are evaluated as follows.

○: All the ten cans show a current value of 0.1 mA or less.

Δ: One to five cans among the 10 cans show a current value of more than 0.1 mA.

X: Six cans or more show a current value of more than 0.1 mA, or the film has cracks after the cans are dropped.

(4) Resistance to embrittlement under heat:

Excellently deep-draw molded cans are heated at 200° C. for 5 minutes, and thereafter evaluated for their impact resistance in the same manner as described in (3) above.

○: All the ten cans show a current value of 0.1 mA or less.

Δ: One to five cans among the 10 cans show a current value of more than 0.1 mA.

Table 3 shows the results of the above evaluations and take-up properties of the 23 films.

TABLE 3

|  | Deep-draw process-ability-1 | Deep-draw process-ability-2 | Impact resistance | Resistance to embrittlement under heat | Resistance to embrittlement under retort treatment | Flavor retaining property | Winding property |
|---|---|---|---|---|---|---|---|
| Comp. Ex. 1 | ⊙ | X | X | X | Δ | ○ | Excellent |
| Ex. 1 | ○ | ⊙ | ○ | ⊙ | ○ | ○ | " |
| Ex. 2 | ○ | ○ | ⊙ | ○ | ○ | ○ | " |
| Ex. 3 | ⊙ | ○ | ○ | ○ | ○ | ○ | " |
| Comp. Ex. 2 | X | — | — | — | — | — | " |
| Comp. Ex. 3 | ○ | ⊙ | ○ | ⊙ | ▲ | Δ | " |
| Ex. 4 | ⊙ | ○ | ⊙ | ○ | ○ | ○ | " |
| Comp. Ex. 4 | ⊙ | Δ | Δ | X | Δ | Δ | " |
| Ex. 5 | ⊙ | ○ | ⊙ | ○ | ○ | ○ | " |
| Ex. 6 | ⊙ | ⊙ | ○ | ○ | ○ | ⊙ | " |
| Ex. 7 | ⊙ | ⊙ | ○ | ⊙ | ⊙ | ⊙ | " |
| Ex. 8 | ⊙ | ○ | ⊙ | ○ | ⊙ | ○ | " |
| Comp. Ex. 5 | ⊙ | ○ | Δ | ○ | Δ | Δ | Excellent |
| Comp. Ex. 6 | ⊙ | Δ | Δ | X | Δ | ○ | " |
| Comp. Ex. 7 | ⊙ | Δ | X | Δ | Δ | ⊙ | Poor |
| Comp. Ex. 8 | ⊙ | ⊙ | ○ | ⊙ | ⊙ | X | Excellent |
| Comp. Ex. 9 | ⊙ | ⊙ | ○ | ⊙ | ⊙ | ○ | Poor |
| Ex. 9 | ⊙ | ⊙ | ○ | ⊙ | ⊙ | ○ | Excellent |
| Ex. 10 | ⊙ | ⊙ | ○ | ⊙ | ⊙ | ○ | " |
| Comp. Ex. 10 | ⊙ | ⊙ | ⊙ | ⊙ | ⊙ | X | " |
| Comp. Ex. 11 | ○ | ⊙ | Δ | Δ | Δ | ○ | " |
| Comp. Ex. 12 | ⊙ | ⊙ | Δ | Δ | Δ | ⊙ | " |
| Comp. Ex. 13 | ⊙ | ⊙ | Δ | Δ | Δ | ⊙ | Excellent |

X: Six cans or more show a current value of more than 0.1 mA, or the film has cracks after heated at 200° C. for 5 minutes.

(5) Resistance to embrittlement under retort treatment (retort resistance):

Excellently deep-draw molded cans are filled with water to full, subjected to a retort treatment at 120° C. for an hour in a steam sterilizer, and thereafter kept at 50° C. for 30 days. Then, ten water-filled cans of the same laminate as one group are dropped from a height of 50 cm on a polyvinyl chloride tiled floor. Then, the cans are subjected to the ERV test.

○: All the ten cans show a current value of 0.1 mA or less.

○: One to five cans among the 10 cans show a current value of more than 0.1 mA.

X: Six cans or more show a current value of more than 0.1 mA, or the film has cracks after the cans are dropped.

(6) Flavor retaining property

Excellently deep-draw molded cans are filled with an aerated drink and tightly closed. The cans are stored at 37° C. for 30 days and opened, and the drink was sensory-tested for a change in the taste.

○: No change in the taste.

Δ: Slight change in the taste.

X: A change was found in the taste.

Table 3 clearly shows that the can produced from a metal plate laminated with the laminated polyester film of the present invention is not only excellent in deep-draw processability, resistance to embrittlement under heat, resistance to embrittlement under retort treatment and flavor retaining property, but also excellent in impact resistance, particularly impact resistance at a low temperature. Further, the can produced from a metal plate laminated with the laminated polyester film of the present invention is free from affecting the taste of beverage and excellent in take-up properties.

Examples 11–18 and Comparative Examples 14–19

A polyethylene terephthalate copolymer having a copolymer component shown in Table 4 (produced in the presence of 0.018 part of tetrabutyl titanate as an ester-exchange catalyst and 0.027 part of germanium oxide as a polycondensation catalyst, and having an intrinsic viscosity 0.64 and containing 0.4% by weight of titanium dioxide having an average particle diameter of 0.2 $\mu$m and 0.01% by weight of spherical silica having an average particle diameter of 1.3 $\mu$m (particle diameter ratio 1.07, relative standard deviation 0.1)) and a polyester composition containing, as a lubricant, spherical silica having an average particle diameter of 1.5 μm and a particle diameter ratio of 1.1, which was composed of polyethylene terephthalate having a copolymer component shown in Table 4 (produced in the presence of tetrabutyl titanate as an ester-exchange catalyst and germanium oxide as a polycondensation catalyst) and polybutylene terephthalate or copolybutylene terephthalate (produced in the presence of tetrabutyl titanate as a polycondensation catalyst), were individually dried, melted and co-extruded through adjacent dies according to conventional methods to laminate and fuse the extrudates, and the laminate was solidified by quenching to form an unstretched laminated film in which the polyethylene terephthalate copolymer formed a first layer (A) and the polyester composition formed a second layer (B).

The above-obtained film had a thickness of 25 μm, the first layer (A) had a thickness of 5 μm, and the second layer (B) had a thickness of 20 μm.

Then, the above unstretched film was stretched in the longitudinal direction at a stretch ratio of 3.0 at 110° C. and then stretched in the transverse direction at a stretch ratio of 3 at 125° C., and the stretched film was heat-set at 190° C. to give a biaxially oriented laminated film.

densation catalyst) containing 0.3% by weight of spherical silica having an average particle diameter of 0.3 μm (particle diameter ratio 1.1, relative standard deviation 0.1) and 0.05% by weight of spherical silica having an average particle diameter of 0.5 μm (particle diameter ratio 1.1, relative standard deviation 0.1) and a polyester composition which was composed of polyethylene terephthalate having a copolymer component shown in Table 5 (produced in the presence of tetrabutyl titanate as an ester-exchange catalyst and germanium oxide as a polycondensation catalyst) and polybutylene terephthalate, were individually dried, melted and co-extruded through adjacent dies according to conventional methods to laminate and fuse the extrudates, and the laminate was solidified by quenching to form an unstretched laminated film in which the polyethylene terephthalate copolymer formed a first layer (A) and the polyester composition formed a second layer (B).

The above-obtained film had a thickness of 25 μm, the first layer (A) had a thickness of 5 μm, and the second layer (B) had a thickness of 20 μm

TABLE 4

| | First layer (A) | | | Second layer (B) | | | | | | | | | Lubri- |
|---|---|---|---|---|---|---|---|---|---|---|---|---|---|
| | | | Glass | Copolymer PET* | | | | PBT** or copolymer PBT | | | | | cant |
| | Copolymer component | Melting | transition | Copolymer component | Melting | Intrinsic | | Copolymer component | Melting | Intrinsic | | | consentration |
| | Composition | mole % | point (°C.) | temp. (°C.) | Composition | mole % | point (°C.) | viscosity *** | Weight (%) | Composition | mole % | point (°C.) | viscosity *** | Weight (%) | (wt. %) |
| Comp. Ex. 14 | IA**** | 20 | 206 | 73 | IA | 6 | 242 | 0.71 | 75 | — | — | 223 | 0.91 | 25 | 0.13 |
| Ex. 11 | " | 18 | 213 | 73 | " | 6 | 242 | 0.71 | 75 | — | — | 223 | 0.91 | 25 | 0.13 |
| Ex. 12 | " | 12 | 229 | 73 | " | 6 | 242 | 0.71 | 75 | — | — | 223 | 0.91 | 25 | 0.13 |
| Ex. 13 | " | 8 | 239 | 74 | " | 6 | 242 | 0.71 | 75 | — | — | 223 | 0.91 | 25 | 0.13 |
| Comp. Ex. 15 | " | 2 | 250 | 76 | " | 6 | 242 | 0.71 | 75 | — | — | 223 | 0.91 | 25 | 0.13 |
| Comp. Ex. 16 | SA***** | 9 | 235 | 55 | " | 6 | 242 | 0.71 | 75 | — | — | 223 | 0.91 | 25 | 0.13 |
| Ex. 14 | " | 5 | 245 | 64 | " | 6 | 242 | 0.71 | 75 | — | — | 223 | 0.91 | 25 | 0.13 |
| Comp. Ex. 17 | IA**** | 12 | 229 | 73 | IA | 9 | 235 | 0.65 | 40 | IA | 5 | 214 | 0.89 | 60 | 0.09 |
| Ex. 15 | " | 12 | 229 | 73 | " | 9 | 235 | 0.70 | 50 | " | 5 | 214 | 0.89 | 50 | 0.08 |
| Ex. 16 | " | 12 | 229 | 73 | SA***** | 9 | 238 | 0.70 | 75 | " | 5 | 214 | 0.89 | 25 | 0.11 |
| Ex. 17 | " | 12 | 229 | 73 | " | 12 | 229 | 0.70 | 80 | — | — | 223 | 0.91 | 20 | 0.12 |
| Comp. Ex. 18 | " | 12 | 229 | 73 | " | 12 | 229 | 0.65 | 100 | — | — | — | — | 0 | 0.15 |
| Comp. Ex. 19 | " | 12 | 229 | 73 | IA | 22 | 208 | 0.65 | 85 | — | — | 223 | 0.92 | 15 | 0.13 |
| Ex. 18 | " | 12 | 229 | 73 | " | 6 | 242 | 0.65 | 55 | IA | 20 | 178 | 0.87 | 45 | 0.08 |

*PET: Polyethylene terephthalate
**PBT: Polybutylene terephthalate
***Intrinsic viscosity before preparation of composition
****IA: Isophthalic acid
*****SA: Sebacic acid Example 19 and Comparative Examples 20–22

A polyethylene terephthalate copolymer having a copolymer component shown in Table 5 (produced in the presence of 0.018 part of tetrabutyl titanate as an ester-exchange catalyst and 0.027 part of germanium oxide as a polycon- Then, the above unstretched film was stretched in the longitudinal direction at a stretch ratio of 3.0 at 110° C. and then stretched in the transverse direction at a stretch ratio of 3.1 at 125° C., and the stretched film was heat-set at 180° C. to give a biaxially oriented laminated film.

TABLE 5

| | First layer (A) | | | | | | | | | |
|---|---|---|---|---|---|---|---|---|---|---|
| | Copolymer component | | Catalyst | | Intrinsic viscosity (***) | Melting point (°C.) | Glass transition temp. (°C.) | Lubricant | | | |
| | Composition | mole % | Ester interchange | Polycondensation | | | | (A) Average particle diameter (μm) | (A) Concentration (wt. %) | (B) Average particle diameter (μm) | (B) Concentration (wt. %) |
| Comp. Ex. 20 | Isophthalic acid | 12 | Manganese acetate | Antimony trioxide | 0.71 | 229 | 73 | 0.3 | 0.3 | 0.5 | 0.05 |
| Comp. Ex. 21 | Isophthalic acid | 12 | Manganese acetate | Antimony trioxide | 0.71 | 229 | 73 | 0.3 | 0.3 | 0.5 | 0.05 |
| Comp. Ex. 22 | Isophthalic acid | 8 | Manganese acetate | Antimony trioxide | 0.70 | 239 | 74 | 0.3 | 0.3 | 0.5 | 0.05 |
| Ex. 19 | Isophthalic acid | 12 | Tetrabutyl-titanate | Germanium dioxide | 0.64 | 229 | 73 | 0.3 | 0.3 | 0.5 | 0.05 |

| | Second layer (B) | | | | | | | | | | | |
|---|---|---|---|---|---|---|---|---|---|---|---|---|
| | Copolymer PET* | | | | | | PTMT** or copolymer PTMT | | | | Lubricant | |
| | Copolymer component | | Catalyst | | Intrinsic viscosity (***) | Melting point (°C.) | Weight (%) | Copolymer component | | Melting point (°C.) | Intrinsic viscosity *** | Weight (%) | Average particle diamter (μm) | Concentration (wt. %) |
| | Composition | mole % | Ester interchange | Polycondensation | | | | Composition | mole % | | | | | |
| Comp. Ex. 20 | Isophthalic acid | 6 | Manganese acetate | Antimony trioxide | 0.65 | 245 | 75 | — | 0 | 223 | 0.91 | 25 | 1.2 | 0.13 |
| Comp. Ex. 21 | Isophthalic acid | 6 | Manganese acetate | Antimony trioxide | 0.65 | 245 | 55 | — | 0 | 223 | 0.91 | 45 | 1.2 | 0.09 |
| Comp. Ex. 22 | Sebasic acid | 9 | Manganese acetate | Antimony trioxide | 0.68 | 235 | 55 | — | 0 | 223 | 0.91 | 45 | 1.2 | 0.09 |
| Ex. 19 | Isophthalic acid | 6 | Tetrabutyl-titanate | Germanium dioxide | 0.70 | 245 | 55 | — | 0 | 223 | 0.91 | 45 | 1.2 | 0.09 |

Examples 20–35

Biaxially oriented films were prepared in the same manner as in Example 12 except that the kinds, particle diameters and amounts of the lubricants were changed as shown in Table 6.

TABLE 6

| | First layer (A) | | | | | | Second layer (B) | | |
|---|---|---|---|---|---|---|---|---|---|
| | Small particle lubricant | | | Large particle lubricant | | | Average particle diameter ratio ($d_1/d_2$) | | | |
| | Kind | Particle diameter $d_1$ (μm) | Amount (wt. %) | Kind | Particle diameter $d_2$ (μm) | Amount (wt. %) | | Kind | Particle diameter $d_3$ (μm) | Amount (wt. %) |
| Ex. 20 | Titanium dioxide | 0.07 | 0.4 | Silica | 1.3 | 0.01 | 18.6 | Silica | 1.8 | 0.1 |
| Ex. 21 | Titanium dioxide | 0.1 | 0.4 | " | 1.3 | 0.01 | 13.0 | " | 1.8 | 0.1 |
| Ex. 22 | Titanium dioxide | 0.4 | 0.4 | " | 1.3 | 0.01 | 3.3 | " | 1.8 | 0.1 |
| Ex. 23 | Titanium dioxide | 0.5 | 0.4 | " | 1.3 | 0.01 | 2.6 | " | 1.8 | 0.1 |
| Ex. 24 | Titanium dioxide | 0.2 | 0.02 | " | 1.3 | 0.01 | 6.5 | " | 1.8 | 0.1 |
| Ex. 25 | Titanium dioxide | 0.2 | 0.2 | " | 1.3 | 0.01 | 6.5 | " | 1.8 | 0.1 |
| Ex. 26 | Titanium dioxide | 0.2 | 0.5 | " | 1.3 | 0.01 | 6.5 | " | 1.8 | 0.1 |

TABLE 6-continued

| | First layer (A) | | | | | | Second layer (B) | | |
|---|---|---|---|---|---|---|---|---|---|
| | Small particle lubricant | | | Large particle lubricant | | | Average particle | | |
| | Kind | Particle diameter $d_1$ (μm) | Amount (wt. %) | Kind | Particle diameter $d_2$ (μm) | Amount (wt. %) | diameter ratio ($d_1/d_2$) | Kind | Particle diameter $d_3$ (μm) | Amount (wt. %) |
| Ex. 27 | Titanium dioxide | 0.2 | 2.5 | " | 1.3 | 0.01 | 6.5 | " | 1.8 | 0.1 |
| Ex. 28 | Titanium dioxide | 0.2 | 0.4 | " | 0.55 | 0.01 | 2.8 | " | 1.8 | 0.1 |
| Ex. 29 | Titanium dioxide | 0.2 | 0.4 | " | 0.7 | 0.01 | 3.5 | " | 1.8 | 0.1 |
| Ex. 30 | Titanium dioxide | 0.2 | 0.4 | " | 1.8 | 0.01 | 9.0 | " | 1.8 | 0.1 |
| Ex. 31 | Titanium dioxide | 0.2 | 0.4 | " | 2.2 | 0.01 | 11.0 | " | 1.8 | 0.1 |
| Ex. 32 | Titanium dioxide | 0.2 | 0.4 | " | 1.3 | 0.002 | 6.5 | " | 1.8 | 0.1 |
| Ex. 33 | Titanium dioxide | 0.2 | 0.4 | " | 1.3 | 0.05 | 6.5 | " | 1.8 | 0.1 |
| Ex. 34 | Titanium dioxide | 0.2 | 0.4 | " | 1.3 | 0.18 | 6.5 | " | 1.8 | 0.1 |
| Ex. 35 | Titanium dioxide | 0.1 | 0.8 | " | 0.35 | 0.02 | 3.5 | " | 1.8 | 0.1 |

Each of the 34 films obtained in Examples 11 to 35 and Comparative Examples 14 to 22 was laminated onto both surfaces of a 0.25 mm thick tin-free steel plate heated at 230° C., and the laminates were cooled with water. Then, disk-shaped pieces having a diameter of 150 mm were taken, and deep-drawn at four stages with a drawing die and a punch to produce side-seamless containers having a diameter of 55 mm (to be abbreviated as "cans" hereinafter).

The above cans were observed and tested, and evaluated on the basis of the same standards as those described in Example 1. The results are shown in Table 7.

TABLE 7

| | Deep-draw process-ability-1 | Deep-draw process-ability-2 | Impact resistance | Resistance to embrittlement under heat | Resistance to embrittlement under retort treatment | Flavor retaining property | Winding property | Overall evaluation |
|---|---|---|---|---|---|---|---|---|
| Comp. Ex. 14 | ⊙ | ⊙ | X | ⊙ | ⊙ | ⊙ | Excellent | X |
| Ex. 11 | ⊙ | ⊙ | ⊙ | ⊙ | ⊙ | ⊙ | " | ○ |
| Ex. 12 | ⊙ | ⊙ | ○ | ○ | ⊙ | ⊙ | " | ○ |
| Ex. 13 | ⊙ | ⊙ | ○ | ○ | ⊙ | ⊙ | " | ○ |
| Comp. Ex. 15 | X | ▲ | — | — | — | — | " | X |
| Comp. Ex. 16 | ⊙ | ⊙ | ○ | ⊙ | ▲ | ▲ | " | X |
| Ex. 14 | ⊙ | ⊙ | ⊙ | ⊙ | ⊙ | ⊙ | " | ⊙ |
| Comp. Ex. 17 | ⊙ | ▲ | ▲ | X | ▲ | ⊙ | " | X |
| Ex. 15 | ⊙ | ⊙ | ⊙ | ○ | ⊙ | ⊙ | " | ⊙ |
| Ex. 16 | ⊙ | ⊙ | ⊙ | ⊙ | ⊙ | ⊙ | " | ○ |
| Ex. 17 | ⊙ | ⊙ | ○ | ⊙ | ⊙ | ○ | " | ⊙ |
| Comp. Ex. 18 | ⊙ | ○ | ▲ | ▲ | ▲ | ○ | " | X |
| Comp. Ex. 19 | ⊙ | ▲ | Δ | ▲ | ▲ | ○ | " | X |
| Ex. 18 | ⊙ | ○ | ○ | ○ | ⊙ | ○ | Excellent | ○ |
| Comp. Ex. 20 | ⊙ | ○ | Δ | ⊙ | ⊙ | ⊙ | " | X |
| Comp. Ex. 21 | ⊙ | ○ | Δ | ⊙ | ○ | ○ | " | X |
| Comp. Ex. 22 | ⊙ | ⊙ | Δ | ⊙ | ⊙ | ○ | " | X |
| Ex. 19 | ⊙ | ○ | ⊙ | ○ | ⊙ | ⊙ | " | ○ |
| Ex. 20 | ○ | ⊙ | ⊙ | ⊙ | ⊙ | ○ | " | ○ |

TABLE 7-continued

|  | Deep-draw process-ability-1 | Deep-draw process-ability-2 | Impact resistance | Resistance to embrittlement under heat | Resistance to embrittlement under retort treatment | Flavor retaining property | Winding property | Overall evaluation |
|---|---|---|---|---|---|---|---|---|
| Ex. 21 | ○ | ⊙ | ⊙ | ⊙ | ⊙ | ⊙ | " | ○ |
| Ex. 22 | ○ | ○ | ⊙ | ○ | ○ | ○ | " | ○ |
| Ex. 23 | ⊙ | ○ | ⊙ | ⊙ | ⊙ | ⊙ | " | ⊙ |
| Ex. 24 | ⊙ | ○ | ○ | ⊙ | ○ | ○ | " | ○ |
| Ex. 25 | ⊙ | ⊙ | ○ | ⊙ | ⊙ | ○ | Excellent | ⊙ |
| Ex. 26 | ○ | ⊙ | ⊙ | ⊙ | ○ | ⊙ | " | ⊙ |
| Ex. 27 | ⊙ | ⊙ | ⊙ | ⊙ | ⊙ | ○ | " | ○ |
| Ex. 28 | ⊙ | ⊙ | ⊙ | ○ | ⊙ | ○ | " | ⊙ |
| Ex. 29 | ⊙ | ○ | ⊙ | ⊙ | ⊙ | ○ | " | ⊙ |
| Ex. 30 | ⊙ | ⊙ | ⊙ | ⊙ | ○ | ○ | " | ○ |
| Ex. 31 | ⊙ | ○ | ⊙ | ⊙ | ⊙ | ⊙ | " | ○ |
| Ex. 32 | ⊙ | ⊙ | ⊙ | ⊙ | ⊙ | ⊙ | " | ⊙ |
| Ex. 33 | ○ | ⊙ | ○ | ⊙ | ⊙ | ○ | " | ⊙ |
| Ex. 34 | ⊙ | ⊙ | ⊙ | ⊙ | ⊙ | ○ | " | ○ |
| Ex. 35 | ⊙ | ⊙ | ⊙ | ⊙ | ⊙ | ⊙ | " | 573 |

Table 7 clearly shows that the can produced from a metal plate laminated with the laminated polyester film of the present invention is not only excellent in deep-draw processability, resistance to embrittlement under heat and resistance to embrittlement under retort treatment, but also excellent in flavor retaining property and impact resistance, particularly impact resistance at a low temperature.

Examples 36–43 and Comparative Examples 23–30

A polyethylene terephthalate copolymer having a copolymer component shown in Table 8 (produced in the presence of 0.018 part of tetrabutyl titanate as an ester-exchange catalyst and 0.027 part of germanium oxide as a polycondensation catalyst; intrinsic viscosity 0.64) containing 0.4% by weight of spherical silica having an average particle diameter of 0.3 μm (particle diameter ratio 1.07, relative standard deviation 0.1) and a polyester composition containing, as a lubricant, spherical silica having an average particle diameter of 1.5 μm and a particle diameter ratio of 1.1, which was composed of polyethylene terephthalate having a copolymer component shown in Table 8 (produced in the presence of tetrabutyl titanate as an ester-exchange catalyst and germanium oxide as a polycondensation catalyst) and polybutylene terephthalate or copolybutylene terephthalate (produced in the presence of tetrabutyl titanate as a polycondensation catalyst), were individually dried, melted and co-extruded through adjacent dies according to conventional methods to laminate and fuse the extrudates, and the laminate was solidified by quenching to form an unstretched laminated film in which the polyethylene terephthalate copolymer formed a first layer (A) and the polyester composition formed a second layer (B).

Then, the above unstretched film was stretched in the longitudinal direction at a stretch ratio of 3.0 at 110° C. and then stretched in the transverse direction at a stretch ratio of 3.0 at 125° C., and the stretched film was heat-set at 190° C. to give a biaxially oriented laminated film.

The above-obtained film had a thickness of 25 μm, the first layer (A) had a thickness of 5 μm, and the second layer (B) had a thickness of 20 μm.

TABLE 8

|  | First layer (A) | | | | Second layer (B) | | | | | | | | | Lubricant concentration (wt. %) |
|---|---|---|---|---|---|---|---|---|---|---|---|---|---|---|
|  | | | | | Copolymer PET* | | | | PBT** or copolymer PBT | | | | | |
|  | Copolymer component | Melting | Glass transition | | Copolymer component | Melting | | | Copolymer component | Melting | | | | |
|  | Composition | mole % | point (°C.) | temp. (°C.) | Composition | mole % | point (°C.) | Intrinsic viscosity *** | Weight (%) | Composition | mole % | point (°C.) | Intrinsic viscosity *** | Weight (%) | |
| Comp. Ex. 23 | IA**** | 20 | 206 | 73 | IA | 6 | 242 | 0.71 | 75 | — | — | 223 | 0.91 | 25 | 0.13 |
| Ex. 36 | " | 18 | 213 | 73 | " | 6 | 242 | 0.71 | 75 | — | — | 223 | 0.91 | 25 | 0.13 |
| Ex. 37 | " | 12 | 229 | 73 | " | 6 | 242 | 0.71 | 75 | — | — | 223 | 0.91 | 25 | 0.13 |
| Ex. 38 | " | 8 | 239 | 74 | " | 6 | 242 | 0.71 | 75 | — | — | 223 | 0.91 | 25 | 0.13 |
| Comp. Ex. 24 | " | 2 | 250 | 76 | " | 6 | 242 | 0.71 | 75 | — | — | 223 | 0.91 | 25 | 0.13 |
| Comp. Ex. 25 | SA***** | 9 | 235 | 55 | " | 6 | 242 | 0.71 | 75 | — | — | 223 | 0.91 | 25 | 0.13 |
| Ex. 39 | " | 5 | 245 | 64 | " | 6 | 242 | 0.71 | 75 | — | — | 223 | 0.91 | 25 | 0.13 |
| Comp. Ex. 26 | IA**** | 12 | 229 | 73 | IA | 9 | 235 | 0.65 | 40 | IA | 5 | 214 | 0.89 | 60 | 0.09 |
| Ex. 40 | " | 12 | 229 | 73 | " | 9 | 235 | 0.70 | 50 | " | 5 | 214 | 0.89 | 50 | 0.08 |
| Ex. 41 | " | 12 | 229 | 73 | SA***** | 9 | 238 | 0.70 | 75 | " | 5 | 214 | 0.89 | 25 | 0.11 |

TABLE 8-continued

| | First layer (A) | | | | Second layer (B) | | | | | | | | Lubri- |
|---|---|---|---|---|---|---|---|---|---|---|---|---|---|
| | | | Glass | Copolymer PET* | | | | | PBT** or copolymer PBT | | | | cant |
| | Copolymer component | Melt- ing | tran- sition | Copolymer component | | Melt- ing | Intrinsic | | Copolymer component | | Melt- ing | Intrinsic | | concen- |
| | Composi- tion | mole % | point (°C.) | temp. (°C.) | Composi- tion | mole % | point (°C.) | viscosity *** | Weight (%) | Composi- tion | mole % | point (°C.) | viscosity *** | Weight (%) | tration (wt. %) |
| Ex. 42 | " | 12 | 229 | 73 | " | 12 | 229 | 0.70 | 80 | — | — | 223 | 0.91 | 20 | 0.12 |
| Comp. Ex. 27 | " | 12 | 229 | 73 | " | 12 | 229 | 0.65 | 100 | — | — | — | — | 0 | 0.15 |
| Comp. Ex. 28 | " | 12 | 229 | 73 | IA | 3 | 247 | 0.65 | 85 | — | — | 223 | 0.91 | 15 | 0.13 |
| Comp. Ex. 29 | " | 12 | 229 | 73 | " | 6 | 242 | 0.65 | 85 | — | — | 223 | 0.91 | 15 | 0.13 |
| Comp. Ex. 30 | " | 12 | 229 | 73 | " | 22 | 208 | 0.65 | 85 | — | — | 223 | 0.92 | 15 | 0.13 |
| Ex. 43 | " | 12 | 229 | 73 | " | 6 | 242 | 0.65 | 55 | IA | 20 | 178 | 0.87 | 45 | 0.08 |

*PET: Polyethylene terephthalate
**PBT: Polybutylene terephthalate
***Intrinsic viscosity before preparation of composition
****IA: Isophthalic acid
*****SA: Sebacid acid Example 44 and Comparative Examples 31–33

A polyethylene terephthalate copolymer having a copolymer component shown in Table 9 (produced in the presence of tetrabutyl titanate as an ester-exchange catalyst and germanium oxide as a polycondensation catalyst) containing 0.25% by weight of spherical silica having an average particle diameter of 0.5 μm (particle diameter ratio 1.1, relative standard deviation 0.1) and a polyester composition containing, as a lubricant, spherical silica having an average particle diameter of 1.2 μm, which was composed of polyethylene terephthalate having a copolymer component shown in Table 9 (produced in the presence of tetrabutyl titanate as an ester-exchange catalyst and germanium oxide as a polycondensation catalyst) and polybutylene terephthalate were individually dried, melted and coextruded through adjacent dies according to conventional methods to laminate and fuse the extrudates, and the laminate was solidified by quenching to form an unstretched laminated film in which the polyethylene terephthalate copolymer formed a first layer (A) and the polyester composition formed a second layer (B).

Then, the above unstretched film was stretched in the longitudinal direction at a stretch ratio of 3.0 at 110° C. and then stretched in the transverse direction at a stretch ratio of 3.1 at 125° C., and the stretched film was heat-set at 180° C. to give a biaxially oriented laminated film.

The above-obtained film had a thickness of 25 μm, the first layer (A) had a thickness of 5 μm, and the second layer (B) had a thickness of 20 μm.

TABLE 9

| | First layer (A) | | | | | | | | |
|---|---|---|---|---|---|---|---|---|---|
| | | | Catalyst | | Intrin- sic visco- sity (***) | Melt- ing point (°C.) | Glass tran- sition temp. (°C.) | Lubrucant | |
| | Copolymer component | | Ester interchange | Polycon- densation | | | | Average particle diameter (μm) | Concent- ration (wt. %) |
| | Composition | mole % | | | | | | | |
| Comp. Ex. 31 | Isophthalic acid | 12 | Manganese acetate | Antimony trioxide | 0.71 | 229 | 73 | 0.3 | 0.3 |
| Comp. Ex. 32 | Isophthalic acid | 12 | Manganese acetate | Antimony trioxide | 0.71 | 229 | 73 | 0.3 | 0.3 |
| Comp. Ex. 33 | Isophthalic acid | 8 | Manganese acetate | Antimony trioxide | 0.70 | 239 | 74 | 0.3 | 0.3 |
| Ex. 44 | Isophthalic acid | 12 | Tetrabutyl- titanate | Germanium dioxide | 0.64 | 229 | 73 | 0.3 | 0.3 |

*PET: Polyethylene terephthalate
**PBT: Polybutylene terephthalate
***Intrinsic viscosity before preparation of composition TABLE 9-continued

| | Second layer (B) | | | | | | | | | | | |
|---|---|---|---|---|---|---|---|---|---|---|---|---|
| | Copolymer PET* | | | | | | PTMT** or copolymer PTMT | | | | Lubricant | |
| | Copolymer component | | Catalyst | | Intrinsic viscosity (***) | Melting point (°C.) | Weight (%) | Copolymer component | | Melting point (°C.) | Intrinsic viscosity *** | Weight (%) | Average particle diamter (μm) | Consentration (wt. %) |
| | Composition | mole % | Ester interchange | Polycondensation | | | | Composition | mole % | | | | | |
| Comp. Ex. 31 | Isophthalic acid | 6 | Manganese acetate | Antimony trioxide | 0.65 | 545 | 75 | — | 0 | 223 | 0.91 | 25 | 1.2 | 0.13 |
| Comp. Ex. 32 | Isophthalic acid | 6 | Manganese acetate | Antimony trioxide | 0.65 | 545 | 55 | — | 0 | 223 | 0.91 | 45 | 1.2 | 0.09 |
| Comp. Ex. 33 | Sebasic acid | 9 | Manganese acetate | Antimony trioxide | 0.68 | 235 | 55 | — | 0 | 223 | 0.91 | 45 | 1.2 | 0.09 |
| Ex. 44 | Isophthalic acid | 6 | Tetrabutyltitanate | Germanium dioxide | 0.70 | 245 | 55 | — | 0 | 223 | 0.91 | 45 | 1.2 | 0.09 |

*PET: Polyethylene terephthalate
**PTMT Polytetramethylene terephthalate
***Intrinsic viscosity before preparation of composition Examples 45–62

Biaxially oriented films were prepared in the same manner as in Example 37 except that the kinds, particle diameters and amounts of the lubricants were changed as shown in Table 10.

TABLE 10

| | First layer (A) Lubricant | | Second layer (B) Lubricant | |
|---|---|---|---|---|
| | Particle diameter (μm) | Amount (wt. %) | Particle diameter (μm) | Amount (wt. %) |
| Ex. 45 | 0.06 | 0.3 | 1.5 | 0.1 |
| Ex. 46 | 0.1 | 0.3 | 1.5 | 0.1 |
| Ex. 47 | 0.3 | 0.3 | 1.5 | 0.1 |
| Ex. 48 | 0.4 | 0.3 | 1.5 | 0.1 |
| Ex. 49 | 0.5 | 0.3 | 1.5 | 0.1 |
| Ex. 50 | 0.5 | 0.1 | 1.5 | 0.1 |
| Ex. 51 | 0.5 | 0.8 | 1.5 | 0.1 |
| Ex. 52 | 0.3 | 0.02 | 1.2 | 0.15 |
| Ex. 53 | 0.3 | 0.05 | 1.2 | 0.15 |
| Ex. 54 | 0.3 | 0.1 | 1.2 | 0.15 |
| Ex. 55 | 0.3 | 0.7 | 1.2 | 0.15 |
| Ex. 56 | 0.3 | 1.0 | 1.2 | 0.15 |
| Ex. 57 | 0.1 | 0.1 | 1.2 | 0.15 |
| Ex. 58 | 0.1 | 1.0 | 1.2 | 0.15 |
| Ex. 59 | 0.06 | 2.0 | 1.2 | 0.15 |
| Ex. 60 | 0.3 | 0.3 | 0.8 | 0.5 |
| Ex. 61 | 0.3 | 0.3 | 1.8 | 0.1 |
| Ex. 62 | 0.3 | 0.3 | 2.3 | 0.1 |

Comparative Examples 34 and 35

A single-layered film formed of a first layer (A) alone (Comparative Example 34) and a single-layered film formed of a second layer (B) alone (Comparative Example 35) were prepared in the same manner as in Example 45.

Each of the 40 films obtained in Examples 36 to 62 and Comparative Examples 23 to 35 was attached to both surfaces of a 0.25 mm thick tin-free steel plate heated at 230° C., and the laminates were cooled with water. Then, disk-shaped pieces having a diameter of 150 mm were taken, and deep-drawn at four stages with a drawing die and a punch to produce side-seamless containers having a diameter of 55 mm (to be abbreviated as "cans" hereinafter).

The above cans were observed and tested, and evaluated on the basis of the same standards as those described in Example 1.

Table 11 shows the results.

TABLE 11

| | Deep-draw processability-1 | Deep-draw processability-2 | Impact resistance | Resistance to embrittlement under heat | Resistance to embrittlement under retort treatment | Flavor retaining property | Winding property | Overall evaluation |
|---|---|---|---|---|---|---|---|---|
| Comp. Ex. 23 | ⊙ | ⊙ | X | ⊙ | ⊙ | ⊙ | Excellent | X |
| Ex. 36 | ⊙ | ⊙ | ⊙ | ⊙ | ⊙ | ⊙ | " | ⊙ |
| Ex. 37 | ○ | ○ | ⊙ | ○ | ⊙ | ⊙ | " | ⊙ |
| Ex. 38 | ○ | ⊙ | ⊙ | ⊙ | ⊙ | ⊙ | " | ⊙ |
| Comp. | X | Δ | — | — | — | — | " | X |

TABLE 11-continued

| | Deep-draw process-ability-1 | Deep-draw process-ability-2 | Impact resistance | Resistance to embrittlement under heat | Resistance to embrittlement under retort treatment | Flavor retaining property | Winding property | Overall evaluation |
|---|---|---|---|---|---|---|---|---|
| Ex. 24 Comp. Ex. 25 | ⊙ | ○ | ⊙ | ⊙ | △ | | " | X |
| Ex. 39 | ⊙ | ⊙ | ○ | ○ | ⊙ | ⊙ | " | ○ |
| Comp. Ex. 26 | ⊙ | △ | △ | X | △ | ⊙ | " | X |
| Ex. 40 | ○ | ○ | ○ | ⊙ | ⊙ | ○ | " | ○ |
| Ex. 41 | ⊙ | ○ | ⊙ | ⊙ | ⊙ | ○ | " | ⊙ |
| Ex. 42 | ○ | ⊙ | ⊙ | ⊙ | ⊙ | ○ | " | ⊙ |
| Comp. Ex. 27 | ⊙ | ○ | | △ | △ | ○ | " | X |
| Comp. Ex. 28 | X | — | — | — | — | — | " | X |
| Comp. Ex. 29 | △ | △ | △ | ⊙ | ⊙ | ⊙ | " | X |
| Comp. Ex. 30 | ⊙ | △ | △ | △ | △ | ○ | Excellent | X |
| Ex. 43 | ⊙ | ○ | ⊙ | ⊙ | ○ | ○ | " | ⊙ |
| Comp. Ex. 31 | ⊙ | ⊙ | △ | ⊙ | ⊙ | ⊙ | " | X |
| Comp. Ex. 32 | ⊙ | ⊙ | △ | ⊙ | ⊙ | ○ | " | X |
| Comp. Ex. 33 | ⊙ | ⊙ | △ | ⊙ | ⊙ | ⊙ | " | X |
| Ex. 44 | ○ | ○ | ○ | ⊙ | ⊙ | ⊙ | " | ⊙ |
| Ex. 45 | ○ | ⊙ | ⊙ | ⊙ | ○ | ⊙ | " | ⊙ |
| Ex. 46 | ⊙ | ⊙ | ○ | ⊙ | ○ | ⊙ | " | ⊙ |
| Ex. 47 | ⊙ | ⊙ | ⊙ | ⊙ | ○ | ⊙ | " | ⊙ |
| Ex. 48 | ⊙ | ⊙ | ○ | ○ | ⊙ | ⊙ | " | ⊙ |
| Ex. 49 | ⊙ | ⊙ | ○ | ○ | ⊙ | ⊙ | " | ○ |
| Ex. 50 | ⊙ | ⊙ | ○ | ○ | ⊙ | ⊙ | " | ⊙ |
| Ex. 51 | ○ | ⊙ | ⊙ | ⊙ | ⊙ | ⊙ | Excellent | ⊙ |
| Ex. 52 | ⊙ | ⊙ | ⊙ | ⊙ | ⊙ | ○ | " | ⊙ |
| Ex. 53 | ⊙ | ⊙ | ⊙ | ⊙ | ⊙ | ⊙ | " | ⊙ |
| Ex. 54 | ⊙ | ⊙ | ⊙ | ⊙ | ⊙ | ⊙ | " | ⊙ |
| Ex. 55 | ⊙ | ○ | ○ | ⊙ | ⊙ | ○ | " | ⊙ |
| Ex. 56 | ⊙ | ⊙ | ⊙ | ⊙ | ⊙ | ○ | " | ⊙ |
| Ex. 57 | ○ | ⊙ | ⊙ | ⊙ | ○ | ⊙ | " | ⊙ |
| Ex. 58 | ⊙ | ⊙ | ⊙ | ⊙ | ○ | ⊙ | " | ⊙ |
| Ex. 59 | ⊙ | ⊙ | ⊙ | ⊙ | ○ | ○ | " | ○ |
| Ex. 60 | ⊙ | ⊙ | ⊙ | ⊙ | ⊙ | ⊙ | " | ⊙ |
| Ex. 61 | ○ | ⊙ | ⊙ | ⊙ | ⊙ | ⊙ | " | ⊙ |
| Ex. 62 | ⊙ | ⊙ | ⊙ | ○ | ⊙ | ⊙ | " | ⊙ |
| Comp. Ex. 34 | ⊙ | ⊙ | ⊙ | ○ | ⊙ | ⊙ | Poor | X |
| Comp. Ex. 35 | ⊙ | ⊙ | ⊙ | ⊙ | ⊙ | X | " | X |

Table 11 clearly shows that the can produced from a metal plate laminated with the laminated polyester film of the present invention is not only excellent in deep-draw processability, resistance to embrittlement under heat and resistance to embrittlement under retort treatment, but also excellent in flavor retaining property and impact resistance, particularly impact resistance at a low temperature.

What is claimed is:

1. A laminated polyester film for use as a film to be laminated on a metal plate, which comprises (A) a first layer formed of (a1) a first aromatic copolyester prepared in the presence of a germanium compound as a polymerization catalyst, which contains terephthalic acid component in an amount of at least 80 mol % based on the total amount of dicarboxylic acid components and ethylene glycol component in an amount of at least 95 mol % based on the amount of glycol components and which has a melting point in the range of from 210° to 245° C. and a glass transition temperature of at least 60° C., the first layer (A) containing 0.01 to 3% by weight of first inert fine particles having an average particle diameter (d1) of 0.05 to 0.6 μm and 0.001 to 0.2% by weight of second inert fine particles having an average particle diameter (d2) of 0.3 to 2.5 μm, a d2/d1 ratio being at least 2.5 and wherein the first layer has an outer surface roughness (Ra) in the range of from 2 to 13 nm, and (B) a second layer formed of (b1) a polyester composition obtained by melt-mixing 90 to 45% by weight of a second aromatic copolyester which is composed of at least 78 mol % based on the total amount of dicarboxylic acids of ethylene terephthalate, is produced in the presence of a germanium compound as a polymerization catalyst and has a melting point in the range of from 210° to 252° C. and 10 to 55% by weight of a third aromatic polyester which is composed of at least 80 mol % based on the total amount of dicarboxylic acids of tetramethylene terephthalate and has a melting point in the range of from 180° to 223° C., the second layer (B) containing 0.03 to 0.5% by weight of third inert fine particles having an average particle diameter (d3) of 0.8 to 2.5 μm and wherein the second layer has an outer surface roughness (Ra) of 15 nm to 50 nm, and (C) which shows a value of 0.1 mA or less when a metal plate laminated therewith is tested for deep-draw processability-2.

2. The laminated polyester film of claim 1, wherein the first aromatic copolyester (a1) shows a melting point in the range of from 215° to 235° C.

3. The laminated polyester film of claim 1, wherein the first layer has a surface roughness (Ra) in the range of from 2 to 10 nm.

4. The laminated polyester film of claim 1, wherein the second aromatic copolyester has a melting point in the range of from 210° to 245° C.

5. The laminated polyester film of claim 1, wherein the second aromatic copolyester contains 2 to 19 mol %, based on a total of glycol components, of at least one glycol component selected from a group consisting of aliphatic glycols other than ethylene glycol and alicyclic glycols.

6. The laminated polyester film of claim 1 wherein the laminated polyester film is a film formed from the first layer (A) and the second layer (B), said layer (B) comprising a blend containing 80 to 45% by the weight of the second aromatic copolyester and 20 to 55% by weight of the third aromatic polyester.

7. The laminated polyester film of claim 1, wherein the second layer (B) has a surface roughness (Ra) in the range of from 15 to 40 nm.

8. The laminated polyester film of claim 1, wherein the first layer (A) contains first inert fine particles having an average particle diameter (d1) of 0.05 to 0.6 μm but substantially does not contain second inert fine particles, the first inert fine particles being contained in an amount which satisfies the following formula, $$0.0072 d1^{-0.65} \leq C \leq 0.80 d1^{-0.44}$$

wherein d1 is an average particle diameter (μm) of the first inert fine particles and C is a content (wt %) of the first inert fine particles.

9. The laminated polyester film of claim 1, wherein the second layer (B) has a cold crystallization temperature in the range of from 90° to 160° C.

10. The laminated polyester film of claim 1 wherein the first aromatic copolyester (a1) contains an isophthalic acid component in an amount of 5 to 19 mol % based on a total of dicarboxylic acid components.

11. The laminated polyester film of claim 1 wherein the second aromatic copolyester contains 2 to 19 mol %, based on a total of dicarboxylic acid components, of at least one dicarboxylic acid component selected form a group consisting of aromatic dicarboxylic acids other than terephthalic acid, aliphatic dicarboxylic acids and alicyclic dicarboxylic acids.

12. The laminated polyester film of claim 1 wherein the third aromatic polyester contains as an additional dicarboxylic acid component, at least one dicarboxylic acid component selected from a group consisting of aromatic dicarboxylic acids other than terephthalic acid, aliphatic dicarboxylic acids and alicyclic dicarboxylic acids.

13. The laminated polyester film of claim 1, wherein a ratio of a thickness of the first layer (A) to a thickness of the second layer (B) is in the range of from 0.02 to 0.67 and wherein the laminated polyester film has a thickness of 6 to 75 μm.

14. The laminated polyester film of claim 1, wherein the first layer (A) has a plane orientation coefficient of 0.08 to 0.16.

15. A laminated polyester film for use as a film to be laminated on a metal plate, which comprises (A) a first layer formed of (a1) a first aromatic copolyester prepared in the presence of a germanium compound as a polymerization catalyst, which contains terephthalic acid component in an amount of at least 80 mol % based on the total amount of dicarboxylic acid components and ethylene glycol component in an amount of at least 95 mol % based on the amount of glycol components and which has a melting point in the range of from 215° to 235° C. and a glass transition temperature of at least 60° C., the first layer (A) containing 0.01 to 3% by weight of first inert fine particles having an average particle diameter (d1) of 0.05 to 0.6 μm and 0.001 to 0.2% by weight of second inert fine particles having an average particle diameter (d2) of 0.3 to 2.5 μm, a d2/d1 ratio being at least 2.5 and wherein the first layer has an outer surface roughness (Ra) in the range of from 2 to 10 nm, and (B) a second layer formed of (b1) a polyester composition obtained by melt-mixing 80 to 45% by weight of a second aromatic copolyester which is composed of at least 78 mol % based on the total amount of dicarboxylic acids of ethylene terephthalate, is produced in the presence of a germanium compound as a polymerization catalyst and has a melting point in the range of from 210° to 245° C. and 20 to 55% by weight of a third aromatic polyester which is composed of at least 80 mol % based on the total amount of dicarboxylic acids of tetramethylene terephthalate and has a melting point in the range of from 180° to 223° C., the second layer (B) containing 0.03 to 0.5% by weight of third inert fine particles having an average particle diameter (d3) of 0.8 to 2.5 μm and having an outermost surface roughness (Ra) of 15 nm to 50 nm, and (C) shows a value of 0.1 mA or less when a metal plate laminated therewith is tested for deep drawn processability-2, and wherein a ratio of a thickness of the first layer (A) to a thickness of the second layer (B) is in the range of from 0.02 to 0.67 and the laminated polyester film has a thickness of 6 to 75 μm.

16. The laminated polyester film of claim 15, wherein the first aromatic copolyester (a1) contains an isophthalic acid component in an amount of 5 to 19 mol % based on a total of dicarboxylic acid components.

17. The laminated polyester film of claim 15, wherein the second aromatic copolyester contains 2 to 19 mol %, based on a total of dicarboxylic acid components, of at least one dicarboxylic acid component selected from a group consisting of aromatic dicarboxylic acids other than terephthalic acid, aliphatic dicarboxylic acids and alicyclic dicarboxylic acids.

18. The laminated polyester film of claim 15, wherein the third aromatic polyester contains, as an additional dicarboxylic acid component, at least one dicarboxylic acid component selected from a group consisting of aromatic dicarboxylic acids other than terephthalic acid, aliphatic dicarboxylic acids and alicyclic dicarboxylic acids.

19. The laminated polyester film of claim 15, wherein the first layer (A) has a plane orientation coefficient of 0.10 to 0.14.

20. A laminated polyester film for use as a film to be laminated on a metal plate, which comprises (A) a first layer formed of (a1) a first aromatic copolyester prepared in the presence of a germanium compound as a polymerization catalyst, which contains terephthalic acid component in an amount of at least 80 mol % based on the total amount of dicarboxylic acid components and ethylene glycol component in an amount of at least 95 mol % based on the amount of glycol components and which has a melting point in the range of from 215° to 235° C. and a glass transition temperature of at least 60° C., the first layer (A) containing 0.01 to 3% by weight of first inert fine particles having an average particle diameter (d1) of 0.05 to 0.6 μm and 0.001 to 0.2% by weight of second inert fine particles having an average particle diameter (d2) of 0.3 to 2.5 μm, a d2/d1 ratio being at least 2.5 and wherein the first layer has an outer surface roughness (Ra) in the range of from 7 to 13 nm, (B) a second layer formed of (b1) a polyester composition obtained by melt-mixing 80 to 45% by weight of a second aromatic copolyester which is composed of at least 78 mol % based on the total amount of dicarboxylic acids of ethylene terephthalate, is produced in the presence of a germanium compound as a polymerization catalyst and has a melting point in the range of from 210° to 245° C. and 20 to 55% by weight of a third aromatic polyester which is composed of at least 80 mol % based on the total amount of dicarboxylic acids of tetramethylene terephthalate and has a melting point in the range of from 180° to 223° C., the second layer (B) containing 0.03 to 0.5% by weight of third inert fine particles having an average particle diameter (d3) of 0.8 to 2.5 μm and wherein said second layer has an outer surface roughness (Ra) of 16 nm to 25 nm, and (C) shows a value of 0.1 mA or less when a metal plate laminated therewith is tested for deep drawn processability-2, and wherein a ratio of a thickness of the first layer (A) to a thickness of the second layer (B) is in the range of from 0.02 to 0.67 and the laminated polyester film has a thickness of 6 to 75 μm.

21. The laminated polyester film of claim 20, wherein the first layer (A) has a plane orientation coefficient of 0.10 to 0.14.

* * * * *